(12) United States Patent
Ng et al.

(10) Patent No.: US 9,960,966 B2
(45) Date of Patent: *May 1, 2018

(54) METHODS AND SYSTEMS FOR MANAGING VPN TUNNELS

(71) Applicant: Pismo Labs Technology Limited, Hong Kong (HK)

(72) Inventors: Kam Chiu Ng, Hong Kong (HK); Patrick Ho Wai Sung, Hong Kong (HK); Kit Wai Chau, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/389,475

(22) Filed: Dec. 23, 2016

(65) Prior Publication Data
US 2017/0195180 A1    Jul. 6, 2017

Related U.S. Application Data

(63) Continuation of application No. 14/382,551, filed as application No. PCT/IB2013/061178 on Dec. 10, 2013, now Pat. No. 9,531,565.

(51) Int. Cl.
*H04L 12/24* (2006.01)
*H04L 12/26* (2006.01)
(Continued)

(52) U.S. Cl.
CPC ...... *H04L 41/0896* (2013.01); *H04L 12/4633* (2013.01); *H04L 12/4641* (2013.01); *H04L 43/0882* (2013.01); *H04L 45/245* (2013.01)

(58) Field of Classification Search
CPC ............. H04L 41/0896; H04L 43/0882; H04L 45/245; H04L 12/4641; H04L 12/4633
See application file for complete search history.

(56) References Cited

U.S. PATENT DOCUMENTS 7,830,787 B1 * 11/2010 Wijnands ................ H04L 12/18
370/218
8,272,046 B2 * 9/2012 Gundavelli, Sr. ... H04L 12/4641
726/14

(Continued)

*Primary Examiner* — Rasheed Gidado
(74) *Attorney, Agent, or Firm* — Hershkovitz & Associates, PLLC

(57) ABSTRACT

The present invention discloses methods and systems for managing VPN tunnels. A VPN concentrator establishes a first aggregated VPN connection and a second aggregated VPN connection with a first host and a first network device respectively. When the first aggregated VPN connection comprises a first plurality of VPN tunnels, the VPN concentrator applies uplink and downlink bandwidth limits to each of the plurality of VPN tunnels. Similarly, when the second aggregated VPN connection comprise a second plurality of VPN tunnels, the VPN concentrator applies uplink and downlink bandwidth limits to each of the plurality of VPN tunnels. The first host encapsulates a first data packet in a first encapsulating packet and transmits the first encapsulating packet to a VPN concentrator using a first aggregated VPN connection. When the VPN concentrator receives the first encapsulating packet, the VPN concentrator decapsulates the first data packet from the first encapsulating packet and encapsulates the first data packet in a second encapsulating packet. The VPN concentrator then transmits the second encapsulating packet to a first network device using a second aggregated VPN connection.

20 Claims, 7 Drawing Sheets

(51) Int. Cl.
*H04L 12/709* (2013.01)
*H04L 12/46* (2006.01)

(56) References Cited

U.S. PATENT DOCUMENTS

| | | | | |
|---|---|---|---|---|
| 8,443,435 B1* | 5/2013 | Schroeder | ........... | H04L 63/0272 726/15 |
| 8,549,617 B2* | 10/2013 | Wei | ..................... | H04L 63/0272 380/247 |
| 9,094,525 B2* | 7/2015 | Dye | ..................... | H04M 3/568 |
| 9,369,398 B2* | 6/2016 | Chan | ..................... | H04L 45/741 |

* cited by examiner

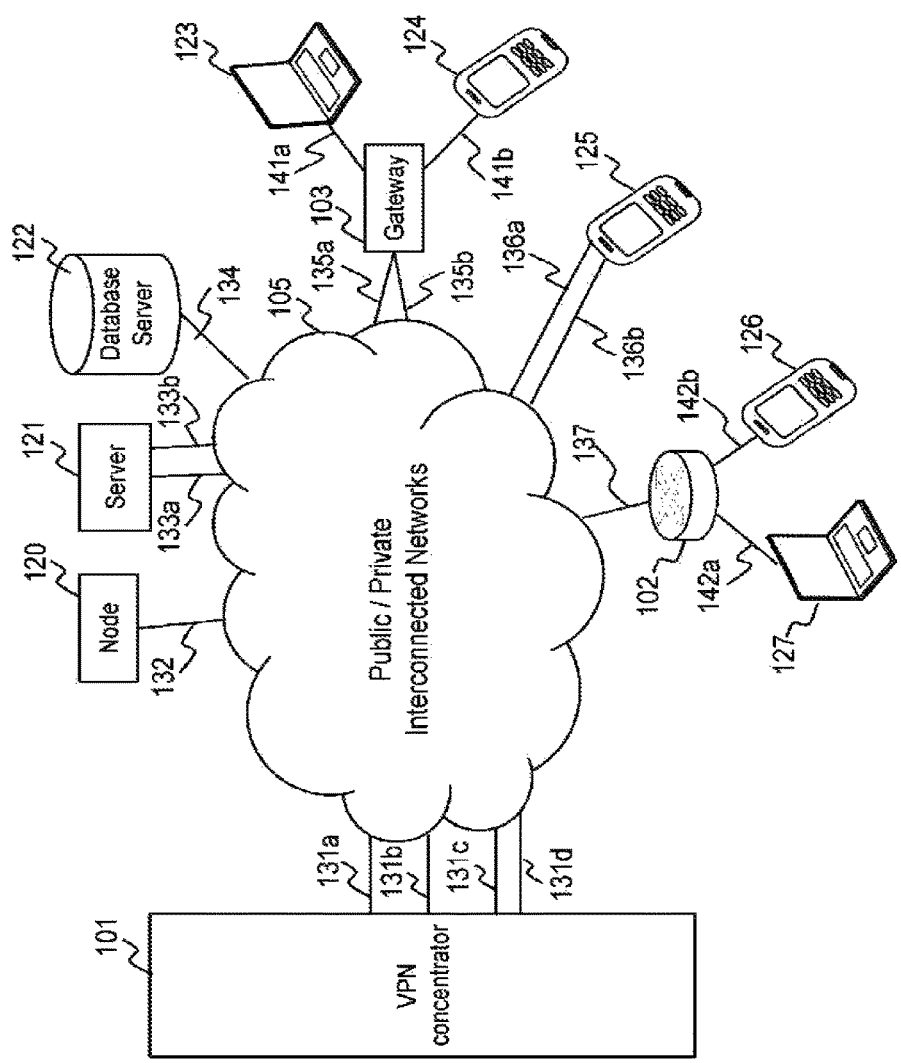
[Fig. 1]

[Fig. 2A]
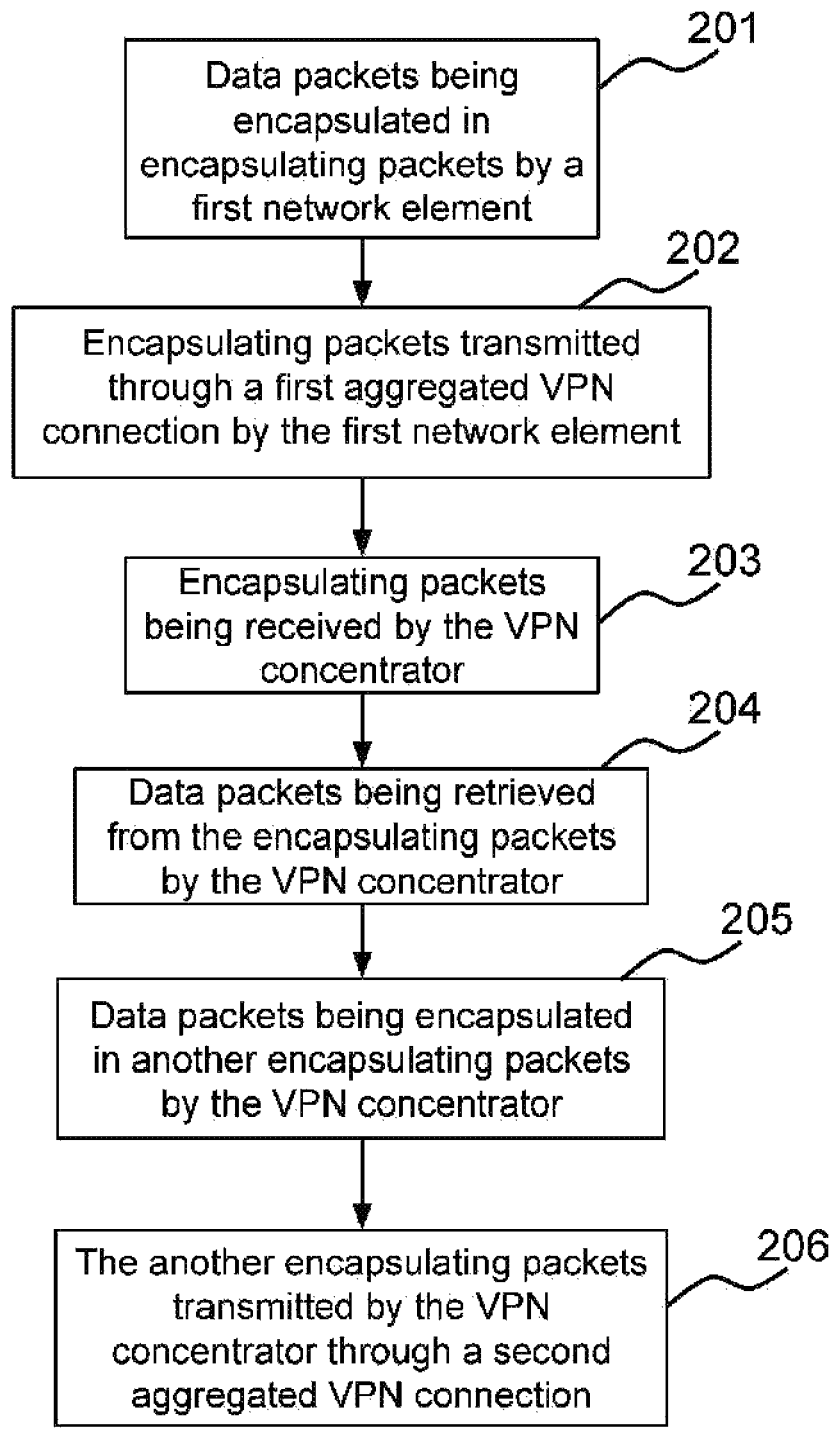

[Fig. 2B]
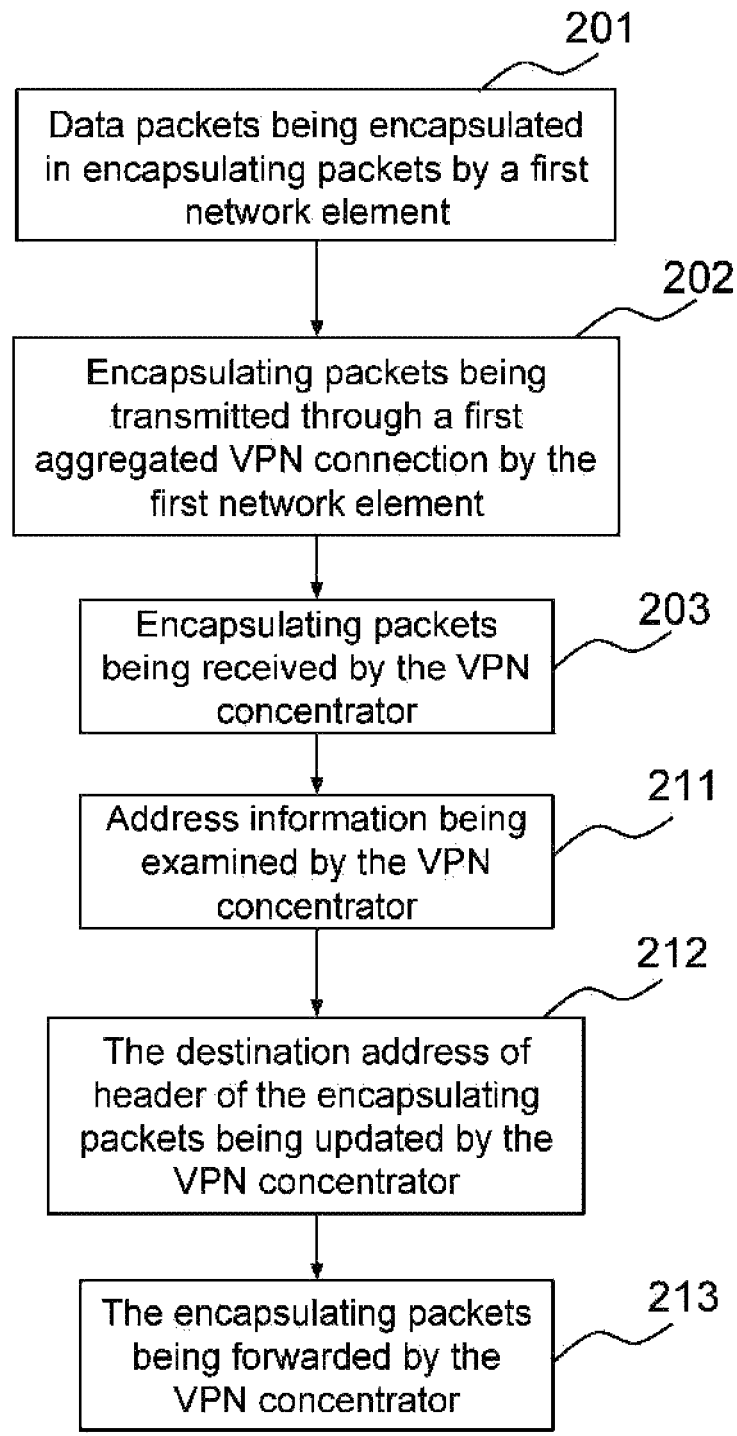

[Fig. 2C]
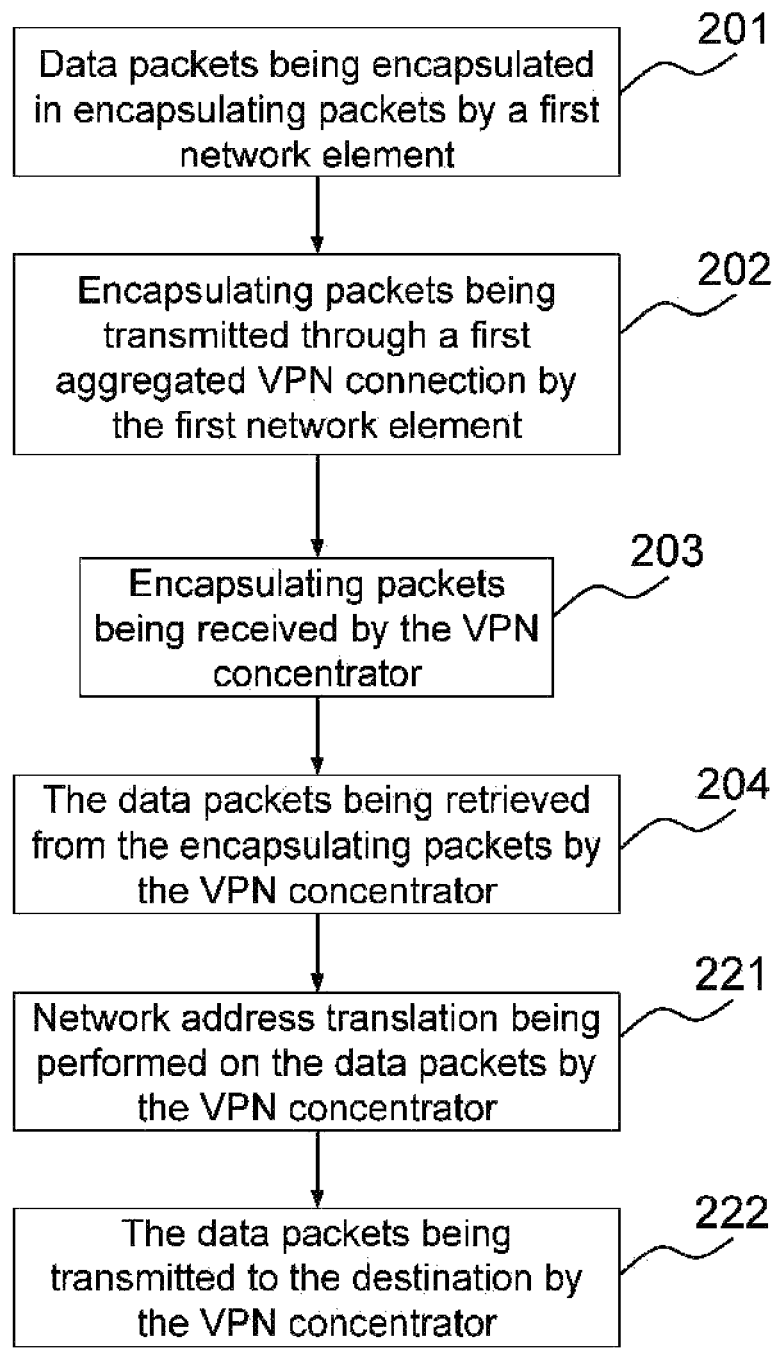

[Fig. 3]
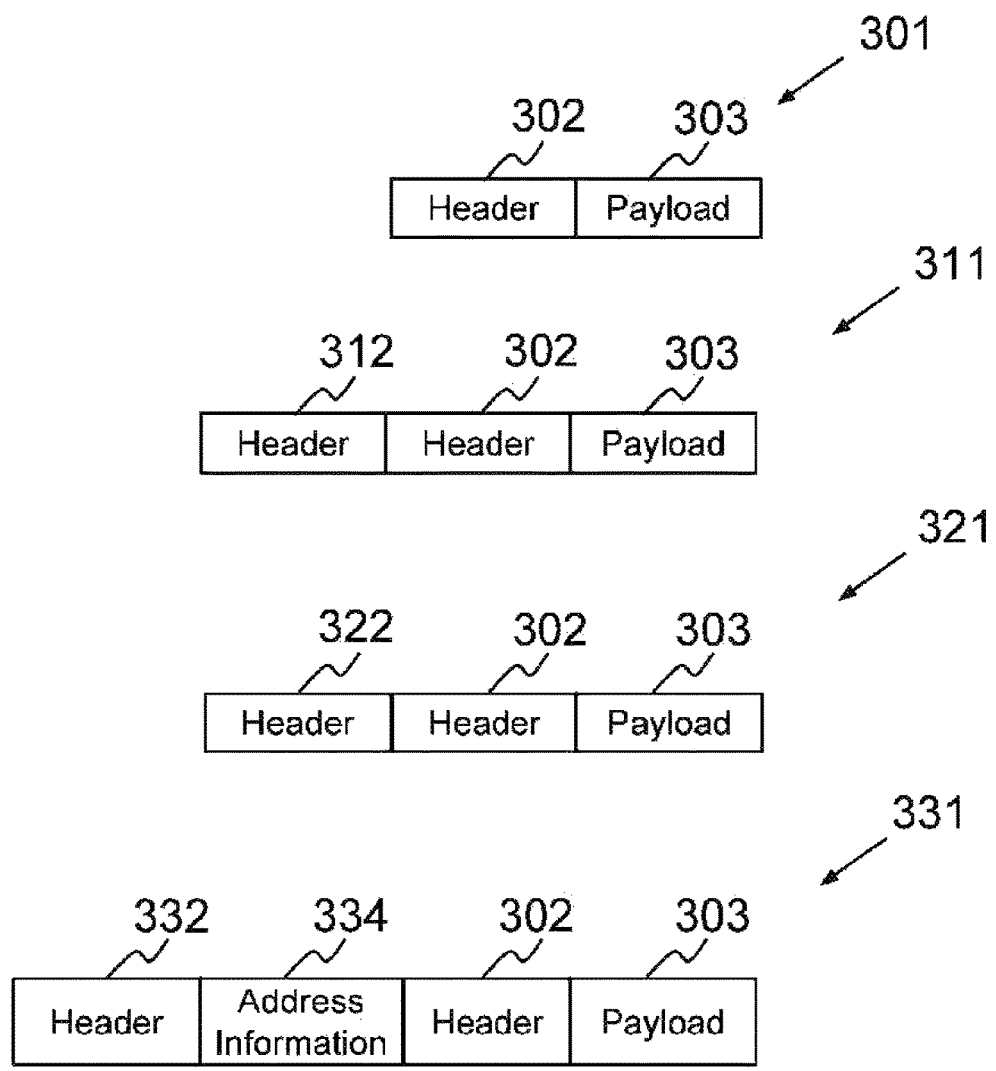

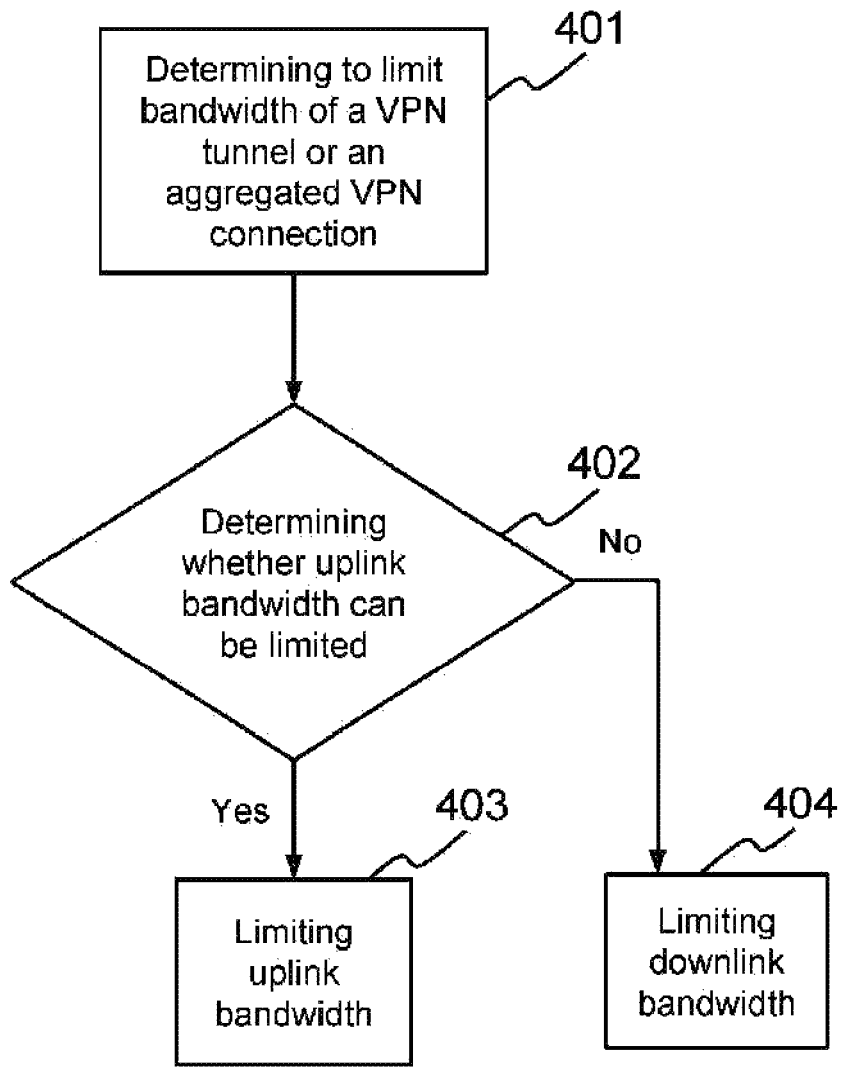
[Fig. 4]

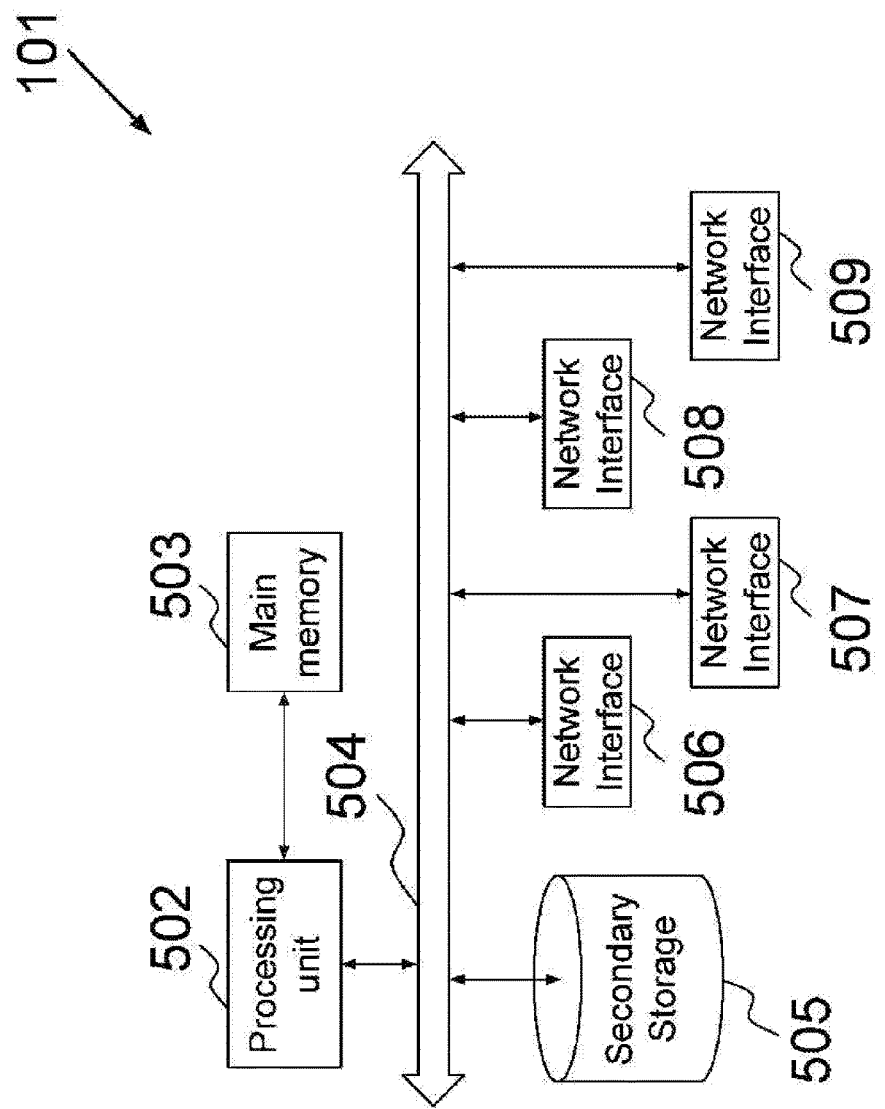
[Fig. 5]

METHODS AND SYSTEMS FOR MANAGING VPN TUNNELS

RELATED APPLICATIONS

The present application is a Non-provisional continuation application which claims the benefits of and is based on application Ser. No. 14/382,551 titled "METHODS AND SYSTEMS FOR TRANSMITTING AND RECEIVING PACKETS" filed on 3 Sep. 2014. The contents of the above-referenced application are herein incorporated by reference.

TECHNICAL FIELD

The present invention relates, in general, to the field of computer networks. More particularly, the present invention relates to methods and systems for establishing and managing aggregated VPN connections comprising a plurality of VPN tunnels.

BACKGROUND ART

Virtual private network (VPN) service providers are able to allow a user to privately browse the web, share files, and access streaming media. VPN service providers deploy VPN concentrators to terminate VPN tunnels. There are two major factors that affect network performance a user can enjoy when connecting to the Internet, an intranet or network node through a VPNs provided by a VPN service provider.

The first factor is the VPN tunnel bandwidth between a user's device and the VPN concentrator deployed by the VPN service provider to terminate the VPN tunnel.

The second factor is the connection bandwidth between the VPN concentrator and the destination that the user wants to access, such as a web site, YouTube, or a file server in an intranet.

If the VPN tunnel bandwidth between the user's device and the VPN concentrator is high but the connection bandwidth between the VPN concentrator and the destination is low, the overall bandwidth experienced by the user would still be low. This is not only limited to bandwidth, but is also applicable in case of other performance criteria such as latency, packet drop, packet jitters, round trip time, bit error rate, etc.

It is common that a VPN service provider does not provide unlimited VPN service so that it may limit VPN tunnel bandwidth by limiting VPN tunnel bandwidth between a user's device and the VPN concentrator, by limiting connection bandwidth between the VPN concentrator and the destination that the user, and/or by limiting number of transfer sessions that can be carried by the VPN.

U.S. Pat. No. 7,921,215 filed on Jan. 12, 2009 and entitled "Method and apparatus for optimizing and prioritizing the creation of a large number of VPN tunnels" has disclosed a number of issues of and solutions for creation of a large number of VPN tunnels and solutions. U.S. Pat. No. 7,631,059 filed on Dec. 8, 2009 and entitled "VPN service management system having a VPN service manager for a provider network and a VPN service agent for a customer network and enabling rapid change of VPN service conditions" has taught embodiments for provisioning VPN services with rapid change of VPN service conditions.

However, when a user's device has a plurality of network interfaces and capable of establishing one or more aggregated VPN connections by aggregating a plurality of VPN tunnels with the VPN concentrator, the VPN concentrator needs to take into the account of the plurality of VPN tunnels established with the user's device when limiting the resource allocated to an aggregated VPN connection and the corresponding VPN tunnels.

DISCLOSURE OF INVENTION

Summary

The present invention discloses methods and systems for managing VPN tunnels, which are implemented using Virtual Private Network (VPN) techniques. The system comprises a VPN concentrator, a first host, and a first network device. The VPN concentrator establishes a first aggregated VPN connection and a second aggregated VPN connection with a first host and a second host respectively. When the first aggregated VPN connection comprise a first plurality of VPN tunnels, the VPN concentrator applies uplink and downlink bandwidth limits to each of the plurality of VPN tunnels. Similarly, when the second aggregated VPN connection comprise a second plurality of VPN tunnels, the VPN concentrator applies uplink and downlink bandwidth limits to each of the plurality of VPN tunnels. During data transmission, the first host encapsulates a first data packet in a first encapsulating packet and transmits the first encapsulating packet to a VPN concentrator using a first aggregated VPN connection. When the VPN concentrator receives the first encapsulating packet, the VPN concentrator decapsulates the first data packet from the first encapsulating packet and encapsulates the first data packet in a second encapsulating packet. The VPN concentrator then transmits the second encapsulating packet to a first network device using a second aggregated VPN connection. A ratio of a bandwidth limit among the first and second plurality of VPN tunnels is set dynamically, according to a policy, or according to a predefined configuration.

According to one of the embodiments, while applying uplink and downlink bandwidth limits to each of the plurality of VPN tunnels of the first aggregated VPN connection, the VPN concentrator allocates the highest ratio of bandwidth limit to a VPN tunnel having highest traffic. Similarly, when applying uplink and downlink bandwidth limits to each of the plurality of VPN tunnels of the second aggregated VPN connection, the VPN concentrator allocates the highest ratio of bandwidth limit to a VPN tunnel having highest traffic.

According to one of the embodiments, when the ratio is set according to a policy, applying uplink and downlink bandwidth limits are performed by allocating a first ratio of bandwidth limit during a first predefined time period, and by allocating a second ratio of bandwidth limit during a second predefined time period.

According to one of the embodiments of the present invention, the ratio is set according to criteria. The criteria are selected from a group consisting of port number, application, time, location, price, network bandwidth availability, and destination address.

According to one of the embodiments of the present invention, the VPN concentrator limits the number of sessions allowed simultaneously in the first plurality of VPN tunnels and/or the second plurality of VPN tunnels.

According to one of the embodiments, the VPN concentrator limits network performance of the first plurality of VPN tunnels and/or the second plurality of VPN tunnels, wherein the network performance to be limited is selected from a group consisting of: packet drop rate, maximum transmission unit (MTU), and quality of service (QoS).

According to one of the embodiments, when the VPN concentrator is unable to apply uplink bandwidth limits, the VPN concentrator applies the downlink bandwidth limits. Similarly, when the VPN concentrator is unable to apply downlink bandwidth limits, the VPN concentrator applies uplink bandwidth limits.

According to one of the embodiments of the present invention, the VPN concentrator examines address information of the first data packet and creates the second encapsulating packet by updating destination address of a header of the first encapsulating packet after receiving the first encapsulating packet. After decapsulating the first data packet from the first encapsulating packet, the VPN concentrator performs network address translation on the first data packet.

The VPN concentrator further sends a tunnel management message to the first host and the second host for applying uplink and downlink bandwidth limits.

BRIEF DESCRIPTION OF DRAWINGS

FIG. 1 illustrates a network environment according to one of the embodiments of the present invention.

FIG. 2A is a flowchart illustrating a process for receiving and/or transmitting encapsulating packets according to one of the embodiments of the present invention.

FIG. 2B is a flowchart illustrating a process for receiving and/or transmitting encapsulating packets according to one of the embodiments of the present invention.

FIG. 2C is a flowchart illustrating a process for receiving and/or transmitting encapsulating packets according to one of the embodiments of the present invention.

FIG. 3 illustrates the relationship among data packets and encapsulating packets according to one of the embodiments of the present invention.

FIG. 4 is a flow-chart illustrating a method for limiting bandwidth according to one of the embodiments of the present invention.

FIG. 5 is a block diagram showing the architecture of a VPN concentrator according to one of the embodiments of the present invention

DETAILED DESCRIPTION

The ensuing description provides preferred exemplary embodiment(s) and exemplary embodiments only, and is not intended to limit the scope, applicability or configuration of the invention. Rather, the ensuing description of the preferred exemplary embodiment(s) and exemplary embodiments will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a sub-program, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage unit, such as a secondary storage.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine readable medium including a virtual machine readable medium in a cloud-based instance.

Furthermore, embodiments may be implemented by hardware, software, firmware, middleware, microcode, hardware description languages, or any combination thereof. When implemented in software, firmware, middleware or microcode, the program instructions or code segments to perform the necessary tasks may be stored in a machine readable medium such as storage unit. A processing unit(s) may perform the necessary tasks. A processing unit(s) can be a CPU, an ASIC semiconductor chip, a semi-conductor chip, a logical unit, a digital processor, an analog processor, a FPGA or any processor that is capable of performing logical and arithmetic functions. A program instruction may represent a procedure, a function, a subprogram, a program, a routine, a subroutine, a module, a software package, a class, or any combination of instructions, data structures, or program statements. A program instruction may be coupled to another program instruction or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. A processing unit(s) can be realized by virtualization, and can be a virtual processing unit(s) including a virtual processing unit in a cloud-based instance.

A network interface may be implemented by a standalone electronic component or may be integrated with other electronic components. A network interface may have no network connection or at least one network connection depending on the configuration. A network interface is only connected to one accessible network. Therefore, there may be more than one network connection being carried by one accessible network. A network interface may be an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

Embodiments, or portions thereof, may be embodied in a computer data signal which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The program instructions may, in certain embodiments, be downloaded via computer networks such as the Internet, an intranet, LAN, MAN, WAN, the PSTN, a satellite communication system, a cable transmission system, and/or the like.

A network element can be a host or a node. A host can be a personal computer, workstations, mainframes, file servers, thin client, PDA, smart phone, or other computing device. A node can be modem, a hub, a bridge, a router, an access point, a gateway, a virtual machine, or a server. A node acts as a connection point, a redistribution point or a communication endpoint. A node is capable of sending, receiving, or forwarding data packets. The term "node" may represent a network node. A node or network node can be realized by virtualization, and can be virtual network node.

A plurality of Virtual Private Network (VPN) tunnels are aggregated or bonded together to form one aggregated VPN connection. Those skilled in the arts would appreciate that there are myriad ways to aggregate or bond a plurality of VPN tunnels to form one aggregated VPN connection. An aggregated VPN connection could be perceived as one VPN connection by sessions or applications that are using it. One example of an aggregated VPN connection is SpeedFusion developed by Peplink.

A data packet can be an IP packet. A data packet can be encapsulated in an encapsulating IP packet. A data packet can also be an encapsulating IP packet if it encapsulates another data packet. A data packet and an encapsulating packet that encapsulates the data packet may be of the same protocol or different protocols.

FIG. 1 illustrates a network environment of a system according to one of the embodiments of the present inventions. The system can be implemented for transmitting and/or receiving data packets using Virtual Private network (VPN) techniques through public/private interconnected networks 105. The system may also be implemented with other types of networks with physical and/or virtual connections established between devices such as node 120, server 121, database server 122, gateway 103, mobile phone 125, router 102, or any other devices connected to public/private interconnected networks 105. VPN concentrator 101 is capable of providing VPN service to devices connected to public/private interconnected networks 105 by terminating VPN tunnels established with devices through public/private interconnected networks 105. Hence VPN concentrator 101 provides secure and controlled access of internal or external networks to hosts or nodes establishing a VPN tunnel or aggregated VPN connection with VPN concentrator 101. Node 120 is connected to public/private interconnected networks 105 through access connection 132. Server 121 is connected to public/private interconnected networks 105 through access connections 133a and 133b. Database server 122 is connected to public/private interconnected networks 105 through access connections 134. Laptop 123 and mobile phone 124 are connected to gateway 103 through local area network (LAN) connections 141a and 141b respectively. Gateway 103 is connected to public/private interconnected networks 105 through access connections 135a and 135b. Mobile phone 125 is connected to public/private interconnected networks 105 through access connections 136a and 136b. Mobile phone 126 and laptop 127 are connected to router 102 through the same LAN connections 142b and 142a respectively, and router 102 is connected to public/private interconnected networks 105 through access connection 137. VPN concentrator 101 connects to public/private interconnected networks 105 using access connections 131a, 131b, 131c and 131d.

In one of the embodiments, VPN concentrator 101 may establish VPN tunnels and/or aggregated VPN connections with hosts or nodes belonging to same or multiple users or administrators. The hosts or nodes belonging to different users or administrators may establish separate VPNs with VPN concentrator 101 and hosts or nodes in one VPN do not have access to another VPN or the data communicated through the another VPN.

Preferably, the number of VPN tunnels and aggregated VPN connections are not so large that it impacts computing and/or network resources of devices forming VPN tunnels with VPN concentrator 101 and/or of VPN concentrator 101.

For illustration purpose, node 120 and database server 122 are public web server and public database server respectively. Therefore, VPN concentrator 101 may not be able to form VPN tunnels with them. VPN concentrator 101 forms aggregated VPN connections with gateway 103, server 121, mobile phone 125 and router 102 respectively. In each aggregated VPN connection, there are at least two VPN tunnels. For example, VPN concentrator may establish two VPN tunnels with mobile phone 125 and the two VPN tunnels are aggregated together to form an aggregated VPN connection.

VPN tunnels can be established between a host or node and VPN concentrator 101, for example, between router 102 and VPN concentrator 101; between mobile phone 125 and VPN concentrator 101; between gateway 103 and VPN concentrator 101; and between server 121 and VPN concentrator 101. VPN concentrator 101 may communicate with hosts and nodes not using VPN tunnels; such as with node 120 and database server 122.

All data packets transmitted and received through public/private interconnected networks 105 by server 121, gateway 103, mobile phone 125 and router 137 should go through VPN concentrator 101. Therefore VPN concentrator performs as a gateway for server 121, gateway 103, mobile phone 125 and router 137. There are many reasons why such design is desirable. For example, gateway 103 can take advantage of aggregated bandwidth of access connections 135a and 135b. In another example, through the VPN tunnels provided by an aggregated VPN connection between mobile phone 125 and VPN concentrator 101 and through the VPN tunnels provided by another aggregated VPN connection between router 102 and VPN concentrator 101, mobile phone 125 is able to communicate with laptop 127 as though mobile phone 125 is in the same LAN. In another example, in order to provide better security, server 121 communicates with node 120 through VPN tunnels provided by an aggregated VPN connection between server 121 and VPN concentrator 101 and an end-to-end connection between node 120 and VPN concentrator 101.

Node 120 may be a modem, a hub, a bridge, a computing device, a router, an access point, a gateway, a virtual machine, a mobile phone or a server. Node 120 acts as a connection point, a redistribution point or a communication endpoint. Node 120 is capable of sending, receiving, or forwarding data packets.

Server 121 can be a database server, file server, mail server, print server, web server, gaming server, application server or the like. Server 121 is a computing device which may be connected to one or more clients through public/ private interconnected networks 105 or any other network. Server 121 can also be a virtualized server.

Database server 122 may contain data required by devices connecting to public/private interconnected networks 105. Database server 122 may be a computing device comprising an internal storage unit.

Gateway 103 can be a router, a gateway, an access point, an IEEE 802.11 access point, a computing device, a virtual machine, or a network node.

Router 102 is a network device that forwards and routes data packets received through public/private interconnected networks 105 to devices connected to it, such as laptop 127 and mobile phone 126. A gateway is capable of establishing VPN tunnels and allowing devices connecting to the gateway's LAN interfaces to transmit and receive data packets through the VPN tunnels.

Public/private interconnected networks 105 can be a public network such as the Internet, a private network administered by one or more entity, or a private network provided by the administrator of the VPN concentrator.

FIG. 5 is an illustrative block diagram of a VPN concentrator, such as VPN concentrator 101 according to one of the embodiments of the present invention. VPN concentrator 101 comprises processing unit 502, main memory 503, system bus 504, secondary storage 505, and a plurality of network interfaces, namely network interfaces 506, 507, 508 and 509. Processing unit 502 and main memory 503 are connected to each other directly. System bus 504 connects processing unit 502 directly or indirectly to secondary storage 505, and network interfaces 506, 507, 508 and 509. Using system bus 504 allows network device 501 to have increased modularity. System bus 504 couples processing unit 502 to secondary storage 505, and network interfaces 506, 507, 508 and 509. System bus 504 can be any of several types of bus structures including a memory bus, a peripheral bus, and a local bus using any of a variety of bus architectures. Secondary storage 505 stores program instructions for execution by processing unit 502. Access connections 131a, 131b, 131c and 131d may be established through network interfaces 506, 507, 508 and 509 respectively. The scope of the invention is not limited to network device 101 having four network interfaces, such that network device 101 may have one or more network interfaces. Network interfaces 506, 507, 508 and 509 are specified for illustration purposes only.

Packet Encapsulation

When data packets are transmitted through VPN tunnels established between a node or a host and VPN concentrator 101, the data packets are encapsulated in encapsulating packets. When the encapsulating packets have arrived at the end of the VPN tunnels, the encapsulating data packets can then be decapsulated and data packets can be extracted. FIG. 3 illustrates the relationship among data packets and encapsulating packets. For illustration purpose only, when mobile phone 125 transmits data packet 301 to laptop 123, the following processes will take place.

Data packet 301 has header 302 and payload 303. Header 302 is used to store source address, destination address and other information. Payload 303 is used to hold data that mobile phone 125 tries to send to laptop 123. In this illustration, the source address is the address of mobile phone 125 and the address is the address of laptop 123. Those who are skilled in the arts would appreciate that data packet 301 can be an Internet Protocol (IP) packet, Ethernet frame, X.25 packet and etc. As illustrated by the processes in the flowchart of FIG. 2A, data packet 301 is encapsulated in first encapsulating packet 311 in step 201 and transmitted by mobile phone 125 to VPN concentrator 101 through a first aggregated VPN connection comprising two or more VPN tunnels in step 202. Encapsulating packet 311 has header 312 and a payload section. Header 312 contains a destination address field set to be the address of a network interface of VPN concentrator 101 and a source address field set to be the address of a network interface of mobile phone 125. The payload section is used to hold packet 301. After VPN concentrator 101 receives first encapsulating packet 311 in step 203, VPN concentrator 101 then decapsulates data packet 301 from first encapsulating packet 311 in step 204. Data packet 301 is then encapsulated in second encapsulating packet 321 by VPN concentrator 101 in step 205. Similar to encapsulating packet 311, encapsulating packet 321 has header 322 and a payload section. Header 322 contains a destination address field set to be the address of a network interface of gateway 103 and a source address field set to be the address of a network interface of VPN concentrator 101. The payload section is used to hold packet 301.

In step 206, VPN concentrator 101 transmits second encapsulating packet 321 to gateway 103 through public/private interconnected networks 105 using a second aggregated VPN connection comprising two or more VPN tunnels established between gateway 103 and VPN concentrator 101. Network nodes of public/private inter-connected networks 105 is able to route second encapsulating packets 321 to gateway 103 according to the destination address in header 322. Gateway 103 then decapsulates data packet 301 from second encapsulating packet 321 and transmits data packet 301 to the destination, i.e. laptop 123. VPN concentrator 101 is capable of transmitting data packet 301 encapsulated in second encapsulating packet 321 to gateway 103 because VPN concentrator 101 is able to determine that gateway 103 is the destination for the first encapsulating packets after examining the destination address in header 302. In this illustration, VPN concentrator 101 performs routing, decapsulation and encapsulation functions.

In one variant, as illustrated in FIG. 2B, VPN concentrator 101 performs no decapsulation and no encapsulation for data packet 301. When mobile phone 125 transmits data packet 301 to laptop 123, data packet 301 is encapsulated in third encapsulating packet 331 in step 201. Mobile phone 125 transmits third encapsulating packet 331 through a first aggregated VPN connection comprising two or more VPN tunnels in step 202. Encapsulating packet 331 has header 332, address information 334 and a payload field. The payload field holds data packet 301. The destination address in header 332 is the IP address of VPN concentrator 101. Address information 334 is the address of gateway 123. When VPN concentrator 101 receives third encapsulating packet 331 in step 203, it determines that third encapsulating packet 331 should be forwarded to gateway 103 through a second aggregated VPN connection by examining address information 334 in step 211. As a result, it updates the destination address in header 332 with the destination address of gateway 103 in step 212. Those skilled in the art would appreciate that when the destination address in header 332 is updated, other fields of third encapsulating packet 331 may also need to be updated, such as checksum. VPN concentrator 101 transmits third encapsulating packet 331 with the updated destination address to gateway 103 in step 213. When gateway 103 receives third encapsulating packet 331, it decapsulates data packet 301 from third encapsulating packet 331 and transmits data packet 301 to the destination, i.e. laptop 123. The benefit of mobile phone 125 including address information 334 in third encapsulating packet 331 is that VPN concentrator 101 does not need to examine the destination address information in header 302 of third encapsulating packet 331. This may reduce computing resources required and may also result in quicker decision being made for the forwarding third encapsulating packet 331. However, in order to determine the address for address information 334, mobile phone 125 has to know the address of gateway 103 in advance.

In another example, as illustrated in the flowchart of FIG. 2C, when mobile phone 125 transmits data packet 301 to node 120, mobile phone 125 encapsulates data packets 301 in first encapsulating packets 311 in step 201 and then transmits first encapsulating packet 311 through an aggregated VPN connection to VPN concentrator 101 in step 202. After receiving first encapsulating packet 311 in step 203, VPN concentrator 101 decapsulates data packet 301 from first encapsulating packet 311 in step 204. Depending on the protocol of data packet 301, a connection, such as Hypertext Transfer Protocol and Secure Sockets Layer (SSL) may be formed between VPN concentrator 101 and node 120, or connectionless data transfer is used, such as User Datagram Protocol (UDP). VPN concentrator 101 performs network address translation (NAT) on data packets 301 in step 221 as the source IP address of data packets 311 should be updated to the IP address of VPN concentrator 101. VPN concentrator 101 then transmits updated data packets 301 to node 120 in step 222.

Similarly, when node 120 transmits data packets to mobile phone 125, node 120 transmits the data packets to VPN concentrator 101. Then VPN concentrator 101 encapsulates the data packets into encapsulating packets and transmits the encapsulating packets to mobile phone 125 through VPN tunnels of an aggregated VPN connection that has been established with mobile phone 125. When mobile phone 125 receives the encapsulating packets, it decapsulates the encapsulating packets to retrieve the data packets.

As an aggregated VPN connection has one or more VPN tunnels, when data packets are encapsulated in encapsulating packets and the encapsulating packets are transmitted through a plurality of VPN tunnels of the aggregated VPN connection, encapsulating packets may be distributed among the plurality of VPN tunnels according to predefined outbound policy, algorithms or load-balancing techniques. The node, host, and/or VPN concentrator 101 that form the aggregated VPN connection are able to decapsulate the encapsulating packets and retrieve the data packets into original order.

Tunnel Management Message

For illustration purpose, when processing unit 502 of VPN concentrator 101 limits the bandwidth for transmitting and/or receiving data packets between mobile phone 125 and laptop 123, processing unit 502 can limit the uplink bandwidth of each VPN tunnel, downlink bandwidth of each VPN tunnel, total VPN tunnels uplink bandwidth, total VPN tunnels downlink bandwidth, aggregated VPN connection uplink bandwidth, and aggregated VPN connection downlink bandwidth.

In one of the embodiments, when a node or host at the one end of a VPN tunnel or an aggregated VPN connection assists or instructs the other node or host at the other end of the VPN tunnel or the aggregated VPN connection to limit the uplink bandwidth and/or downlink bandwidth, the node or host needs to inform the other node or host through a tunnel management message.

In one variant, the tunnel management message is sent by VPN concentrator 101 before the corresponding VPN tunnel or aggregated VPN connection is established with a host or node, such as mobile phone 125. Mobile phone 125 can then establish the VPN tunnel or aggregated VPN connection based on information in the tunnel management message. For example, VPN concentrator 101 sends the tunnel management message to mobile phone 125, and the VPN tunnel or aggregated VPN connection is established some time after the tunnel management message has been sent. The uplink bandwidth limit and/or downlink bandwidth limit at mobile phone 125 is applied according to the tunnel management message immediately after establishing the VPN tunnel or the aggregated VPN connection. The computing resources required at mobile phone 125 for establishing the VPN tunnel or the aggregated VPN connection may be less if the establishment is based on the tunnel management message.

In one variant, VPN concentrator 101 sends the tunnel management message to mobile phone 125 during establishment of the corresponding VPN tunnel or aggregated VPN connection. For illustration purpose VPN concentrator 101 determines the uplink bandwidth limit and/or the downlink bandwidth limit at mobile phone 125 according to the network bandwidth availability during the time of establishment of the VPN tunnel or the aggregated VPN connection. The determined uplink bandwidth limit and/or the downlink bandwidth limit is then included in the tunnel management message. This is beneficial because the current network status is taken into account by VPN concentrator 101 while creating and sending the tunnel management message.

In one variant, the tunnel management message is sent by VPN concentrator 101 after establishing a VPN tunnel or an aggregated VPN connection with mobile phone 125. This may be beneficial because the uplink bandwidth limit and/or downlink bandwidth limit at mobile phone 125 can be determined based on the actual amount of traffic passing through the VPN tunnel or the aggregated VPN connection. The uplink bandwidth limit and/or downlink bandwidth limit can also be determined according to criteria such as port number, an application, a time, and/or a destination address corresponding to traffic passing through the VPN tunnel or the aggregated VPN connection. These criteria and the actual amount of traffic may not be known before or during establishment of the VPN tunnel or the aggregated VPN connection. Therefore, the tunnel management message is sent after establishing the VPN tunnel or aggregated VPN connection.

In one variant, the tunnel management message can be sent anytime while the corresponding VPN tunnel or aggregated VPN connection is still in operation. This allows the limit to be changed if necessary. The tunnel management message can be in the format of binary data, text, and Extensible Markup Language (XML) format message.

The tunnel management message includes uplink flag, downlink flag, VPN tunnel identity and the amount of bandwidth to be limited. The uplink flag is used to indicate whether the bandwidth limitation is uplink bandwidth limit. The downlink flag is used to indicate whether the bandwidth limitation is downlink bandwidth limit. The VPN tunnel identity is used for determining which VPN tunnel the bandwidth limitation should be applied. The amount of bandwidth to be limited is used for stating the amount of bandwidth to be limited in the VPN tunnel, i.e. the uplink bandwidth limit or the downlink bandwidth limit. In one variant, the identity of the VPN tunnel can be omitted. Then the bandwidth limitation is applied to all VPN tunnels of the aggregated VPN connection.

In one variant, the tunnel management message includes VPN tunnel identity and information for number of sessions allowed. The VPN tunnel identity is used for determining which VPN tunnel the number of sessions limitation should be applied. The information for number of sessions allowed is used for determining the number of sessions that should be allowed through the VPN tunnel simultaneously. In one variant, the identity of the VPN tunnel can be omitted. Then the number of sessions limitation is applied to all VPN tunnels of the aggregated VPN connection.

In one variant, the tunnel management message comprises information for at least one of port number, application, a time, a location, network bandwidth availability, destination address. For example, the information for the port number is used to indicate which port number should the bandwidth limitation be applied. Therefore bandwidth of a VPN tunnel using a port number specified in the tunnel management message is limited. The information for the application is used to indicate which application should the bandwidth limitation be applied. Therefore bandwidth of a VPN tunnel being used for an application specified in the tunnel management message is limited. The information for the time is used to indicate at which time, or the time period after which, the bandwidth limitation should be applied. Therefore bandwidth of a VPN tunnel is limited at a time specified in the tunnel management message, or the bandwidth of the VPN tunnel is limited after the VPN tunnel has been used for a time period specified in the tunnel management message. The information for the location is used to indicate in which location the bandwidth limitation should be or should not be applied. For example, when host or node receiving the tunnel management message is within a first location, the bandwidth limitation should not be applied. When the host or node is outside the first location, the bandwidth limitation should be applied. The information for the network bandwidth availability is used to indicate the network bandwidth when the bandwidth limitation should be applied. Therefore, when network bandwidth availability is equal to or less than that specified in the tunnel management message, bandwidth of one or more VPN tunnels in the aggregated VPN connection is limited. The identity of the one or more VPN tunnels can be specified in the VPN tunnel identity of the tunnel management message.

Limiting Bandwidth of a VPN Tunnel

In one of the embodiments of the present invention, the uplink bandwidth of a VPN tunnel is limited by specifying an uplink bandwidth limit. For example, router 102 establishes a VPN tunnel, with VPN concentrator 101 using access connections 137 and 131*a*. For illustration purpose only, uplink bandwidth of the VPN tunnel is limited to 15 Mbps by configuring router 102 to transmit data packets to VPN concentrator 101 using no more than 15 Mbps, and configuring VPN concentrator 101 to transmit data packets to router 102 using no more than 15 Mbps. Therefore, the uplink bandwidth of both router 102 and VPN concentrator 101 is limited to 15 Mbps for the VPN tunnel. Uplink bandwidth at each end of the VPN tunnel may or may not be different. For example, uplink bandwidth of the VPN tunnel is limited to 10 Mbps at router 102, and is limited to 15 Mbps at VPN concentrator 101.

Alternatively, downlink bandwidth of the VPN tunnel is limited by specifying a downlink bandwidth limit. For illustration purpose only, downlink bandwidth of the VPN tunnel is limited to 15 Mbps at VPN concentrator 101. When data packets arriving rate approaches a threshold, VPN concentrator 101 first buffer the data packets in secondary storage 505 in order to limit the downlink bandwidth to 15 Mbps. When there is no more buffer space available to temporarily store the data packets, processing unit 502 starts dropping the data packets.

In one variant, both uplink and downlink bandwidth of a VPN tunnel is limited. The limit of uplink bandwidth and the limit of downlink bandwidth can be the same or different. For example, the uplink bandwidth limit of a VPN tunnel is 10 Mbps while the downlink bandwidth limit of the VPN tunnel is 20 Mbps. In another example, both the uplink bandwidth limit and the downlink bandwidth limit of the VPN tunnel is 10 Mbps.

Limiting Bandwidth of an Aggregated VPN Connection

In one of the embodiments of the present invention, the uplink bandwidth of an aggregated VPN connection is limited. For example, server 121 establishes a first aggregated VPN connection with VPN concentrator 101. The first aggregated VPN connection is formed by aggregating a first VPN tunnel and a second VPN tunnel and both first VPN tunnel and second VPN tunnel can be used to carry data packets belonging to one same session. The first VPN tunnel, for example, is established using access connections 133*a* and 131*a* and the second VPN tunnel is established using access connections 133*b* and 131*b*. For illustration purpose only, the uplink bandwidth limit of the first aggregated VPN connection is determined to be 15 Mbps. Therefore, uplink bandwidth of the first aggregated VPN connection is limited to 15 Mbps by configuring server 121 to transmit data packets to VPN concentrator 101 through the first and second VPN tunnels using no more than a combined bandwidth of 15 Mbps. Similarly, for example, VPN concentrator 101 is configured to transmit data packets to server 121 through the first and second VPN tunnels using no more than a combined bandwidth of 15 Mbps. Therefore, data packets can be transmitted through the first aggregated VPN connection using no more than 15 Mbps bandwidth. In one variant, uplink bandwidth is limited by limiting the uplink bandwidth of each of the first and second VPN tunnels. For example, the uplink bandwidth of the first and second VPN tunnels is limited to 8 Mbps and 7 Mbps respectively, such that the combined uplink bandwidth of the first aggregated VPN connection is limited to 15 Mbps.

Alternatively, downlink bandwidth of an aggregated VPN connection is limited. For illustration purpose only, downlink bandwidth limit is determined to be 15 Mbps. Therefore the downlink bandwidth of the first aggregated VPN connection is limited at VPN concentrator 101 to 15 Mbps. When data packet arriving rate through the first aggregated VPN connection approaches a threshold, VPN concentrator 101 starts dropping data packets in one or more VPN tunnels of the first aggregated VPN connection, in order to limit the downlink bandwidth to 15 Mbps. It is preferred to drop data packets in the worst performing VPN tunnel first because overall network performance could be affected less significantly comparing to dropping data packets in other well performing VPN tunnels. Other techniques to choose which VPN tunnels to drop data packets, including choosing the most expensive VPN tunnel, and choosing one or more VPN tunnels according to a predefined priority corresponding to each of the one or more VPN tunnels, etc.

In one variant, both uplink bandwidth and downlink bandwidth of an aggregated VPN connection are limited. The limit of uplink bandwidth and the limit of downlink bandwidth can be the same or different. For example, the uplink bandwidth limit of an aggregated VPN connection is 10 Mbps while the downlink bandwidth limit of the aggregated VPN connection is 20 Mbps.

Limiting Bandwidth of Combined VPN Connection

The difference between a combined VPN connection and an aggregated VPN connection is that: in a combined VPN connection, data packets belonging to one session are carried by one of the tunnels of the combined VPN connection consistently and no other tunnels of the combined VPN connection should be used to transmit or receive data packets of the same one session; in an aggregated VPN connection, any of the tunnels of the aggregated VPN connection can be used to transmit and received data packets of the same one session.

According to one of the embodiments of the present invention, the uplink bandwidth of a combined VPN connection is limited. When the uplink bandwidth of one of, a plurality of or all of the VPN tunnels in the combined VPN connection is more than or/and about to be more than the uplink bandwidth limit, processing unit of a host or node that establishes the combined VPN connections stop transmitting data packets. In one variant, the downlink bandwidth of a combined VPN connection is limited. When the downlink bandwidth of one of, a plurality of or all of the VPN tunnels in the combined VPN connection is more than or/and about to be more than the downlink bandwidth limit, processing unit of the host or node that establishes the combined VPN connections starts dropping data packets.

In one variant, both uplink and downlink bandwidth of a combined VPN connection is limited. The limit of uplink bandwidth and the limit of downlink bandwidth can be the same or different. For example, the uplink bandwidth limit of a combined VPN connection is 10 Mbps while the downlink bandwidth limit of the combined VPN connection is 20 Mbps.

Limiting Bandwidth of an Access Connection

According to one of the embodiments, VPN concentrator 101 limits the bandwidth available to access connections if VPN concentrator 101 can control bandwidth available to access connections. For example, if the total uplink bandwidth of access connections 136a and 136b is limited to 10 Mbps, mobile phone 125 cannot transmit data packets with a bandwidth higher than 10 Mbps through a wireless connection mobile phone 125 established with a wireless network, even if the wireless network allows mobile phone 125 to transmit data packets with more than 10 Mbps bandwidth. In another example, uplink bandwidth of access connection 136a is limited to 20 Mbps but downlink bandwidth of access connection 137 is limited to 5 Mbps. Then mobile phone 125 can transmit data packets with a bandwidth not higher than 5 Mbps to devices connected to router 102, namely laptop 127 or mobile phone 126, and packet drop may be experienced at router 102.

Preferring to Limit Uplink Bandwidth Rather than Downlink Bandwidth

In a preferred embodiment, uplink bandwidth of a VPN tunnel is limited. For example, a first VPN tunnel is established between server 121 and VPN concentrator 101 through access connections 133a and 131d and the uplink bandwidth of the first VPN tunnel is limited. For illustration purpose only, VPN concentrator 101 sends a tunnel management message to server 121 for limiting the uplink bandwidth at server 121 for the first VPN tunnel 15 Mbps, such that the VPN concentrator may not need to limit the downlink bandwidth at VPN concentrator 101 to 15 Mbps for the first VPN tunnel. Similarly, the uplink bandwidth at VPN concentrator 101 for the first VPN tunnel is limited to 10 Mbps instead of limiting the downlink bandwidth at server 121 to 10 Mbps. It is preferred to limit uplink bandwidth of server 121 and VPN concentrator 101 than to limit downlink bandwidth of server 121 and VPN concentrator 101 because when uplink bandwidth is limited, fewer data packets are transmitted. When limiting downlink bandwidth of server 121 and VPN concentrator 101, data packets are still being transmitted but are dropped when reaching the destination and results in less efficient use of bandwidth. Similarly, it is preferred to limit egress bandwidth than to limit ingress bandwidth because when limiting transmission of data packets, the bandwidth is preserved. When dropping received data packets to limit the downlink bandwidth, the received data packets have already consumed resources, such as bandwidth and processing time. Therefore dropping received data packets is not preferred. Limiting the uplink bandwidth at one end of a VPN tunnel can result in the same effect of limiting the downlink bandwidth at the other end of the VPN tunnel.

One of the benefits of limiting the uplink bandwidth of a VPN tunnel is that less data packets are dropped at the device receiving the data packets. It is preferred that downlink bandwidth of a VPN tunnel at a device receiving the data packets is higher than the uplink bandwidth of the VPN tunnel at a device transmitting the data packets. For example, downlink bandwidth of a VPN tunnel at server 121 is higher than uplink bandwidth of the VPN tunnel at VPN concentrator 101 and downlink bandwidth of the VPN tunnel at VPN concentrator 101 is higher than uplink bandwidth of the VPN tunnel at server 121. Therefore, when data packets are transmitted from server 121 to VPN concentrator 101 using the uplink bandwidth through the VPN tunnel at server 121, the packet drop at VPN concentrator 101 is minimized because the downlink bandwidth of the VPN tunnel at VPN concentrator 101 is higher than the uplink bandwidth at server 121. The same applies to uplink and downlink bandwidths of aggregated VPN connections.

In one variant, the uplink bandwidth at server 121 is managed by a management software module running in VPN concentrator 101. This provides a central management capability, such that aggregated VPN connections established at VPN concentrator 101 can be managed through the management software module. In one variant, the uplink bandwidth at server 121 is managed by a management software module running in a host as the management software module can be executed in one or more computing devices different from VPN concentrator 101. For example, the management software module is hosted at node 120 and is executed by a processing unit of node 120. The management software module communicates with VPN concentrator 101 and server 121, in order to manage the VPN tunnel bandwidth and/or network performance. The management software module can also be used for managing aggregated VPN connections established between hosts or nodes and VPN concentrator 101.

In one variant, server 121 transmits data packets to VPN concentrator 101 through a first aggregated VPN connection, and the data packets are then forwarded to mobile phone 125 by VPN concentrator 101 through a second aggregated VPN connection. Therefore server 121 is able to communicate with mobile phone 125 through VPN concentrator 101. For example, server 121 and mobile phone 125 communicate only with each other through VPN concentrator 101. For illustration purpose only, uplink bandwidth of the first aggregated VPN connection at mobile phone 125 is limited to 10 Mbps and uplink bandwidth of the second aggregated VPN connection at VPN concentrator 101 is limited to 7 Mbps. When server 121 is transmitting data packets with the rate of more than 7 Mbps to mobile phone 125 through the first aggregated VPN connection and the second aggregated VPN connection, VPN concentrator 101 will buffer data packets that cannot be transmitted through the second aggregated VPN connection in secondary storage 505. When there is no more buffer space available to temporarily store the data packets, VPN concentrator 101 starts dropping the data packets in order to limit the uplink bandwidth of the second aggregated VPN connection to the mobile phone 125 within 7 Mbps. In order to minimize packet drop, the uplink bandwidth limit of the first aggregated VPN connection at server 121 for transmitting data packets to mobile phone 125 through VPN concentrator 101 should be lower than the uplink bandwidth limit of the second aggregated VPN connection at VPN concentrator 101 for transmitting the data packets to mobile phone 125. Similarly, in order to minimize packet drop for data packets that are transmitted by mobile phone 125 to server 121 through VPN concentrator 101, uplink bandwidth limit of the second aggregated VPN connection at mobile phone 125 for transmitting data packets to server 121 should be lower than the uplink bandwidth of the first aggregated VPN connection at VPN concentrator 101 for transmitting data packets to server 121.

In one variant, multiple hosts or nodes are able to communicate with mobile phone 125 through VPN concentrator 101. For illustration purpose only, the uplink bandwidth at VPN concentrator 101 for transmitting data packets to mobile phone 125 is limited to 20 Mbps and the total uplink bandwidth for data packets transmitted by the multiple hosts or nodes to mobile phone 125 through VPN concentrator 101 is limited to 30 Mbps. When data packets destined to mobile phone 125 are arriving at VPN concentrator 101 at a rate of more than 20 Mbps, VPN concentrator buffers data packets that cannot be transmitted to mobile phone 125 in secondary storage 505. When there is no more buffer space available to temporarily store the arriving data packets, VPN concentrator 101 starts dropping the data packets in order to limit the uplink bandwidth at VPN concentrator 101 for transmitting data packets to mobile phone 125 to 20 Mbps. In order to minimize packet drop at VPN concentrator 101, the total uplink bandwidth of data packets transmitted by the multiple hosts or nodes to mobile phone 125 through VPN concentrator 101 should be lower than the uplink bandwidth at VPN concentrator 101 for transmitting the data packets to mobile phone 125.

Limit Downlink Bandwidth when Host or Node is not Compatible

According to one of the embodiments, VPN concentrator 101 limits the downlink bandwidth available for data transfer through a VPN tunnel or aggregated VPN connection regardless of whether VPN concentrator 101 can control uplink bandwidth of hosts or nodes connecting to public/private interconnected networks 105. In this embodiment, VPN concentrator 101 is unable to control uplink or downlink bandwidth at a host or node on the other end of the VPN tunnel or aggregated VPN connection. For example, a first VPN tunnel is established between VPN concentrator 101 and server 121. Server 121 is not fully compatible with VPN concentrator 101 because its firmware is not up-to-date or cannot be managed by VPN concentrator 101. In this case, when VPN concentrator 101 cannot limit the uplink bandwidth of at server 121 for the first VPN tunnel, VPN concentrator 101 limits the downlink bandwidth at VPN concentrator 101 for data packets arriving from server 121, i.e., for the first VPN tunnel. When data packets arriving rate from server 121 exceeds a threshold, VPN concentrator 101 drops some or all of the data packets to try to limit the downlink bandwidth. As data packets are dropped, server 121 notices from protocol, such as TCP, that it may need to reduce the data packet transmission rate to VPN concentrator 101.

Prompting Host or Node to Upgrade Firmware when it is not Compatible

Alternatively, when a node or host is not compatible with VPN concentrator 101 such that the node or host is not manageable by VPN concentrator 101 to limit the uplink bandwidth at the node or host, the node or host is required to upgrade its firmware in order to be compatible with the VPN concentrator 101. For example, server 121 is required to be upgraded with a firmware in order to be fully compatible with VPN concentrator 101. Then VPN concentrator 101 can limit the uplink bandwidth at server 121. In one variant, if a node or host tries to establish a VPN tunnel with VPN concentrator 101 and the node or host is not compatible with VPN concentrator 101, the administrator of the node or host is prompted to upgrade its firmware or software before one or more VPN tunnels can be established. In one variant, the node or host automatically upgrades its firmware or software by retrieving the updated version from a server.

Allocation of Bandwidth Among VPN Tunnels of an Aggregated VPN Connection

According to one of the embodiments, when there is a plurality of VPN tunnels between two network nodes or hosts, such as between server 121 and VPN concentrator 101, different uplink and/or downlink bandwidth limits are applied to the VPN tunnels. For illustration purpose only, the uplink bandwidth of a first VPN tunnel of a combined VPN connection is limited to 10 Mbps, while the uplink bandwidth of a second VPN tunnel of the combined VPN connection is limited to 30 Mbps. The first VPN tunnel is established using access connection 133a and the second VPN tunnel is established using access connection 133b. There are myriad reasons why different bandwidth limits are allocated to the first and second VPN tunnels. For example, the usage price of access connection 133a is lower than that of access connection 133b. Therefore, the first VPN tunnel is allowed to utilize lower bandwidth in order to minimize the cost. The ratio of a bandwidth limit among the VPN tunnels of a combined VPN connection or an aggregated VPN connection formed between VPN concentrator 101 and a network element may be set dynamically, according to a policy, or according to a predefined configuration. The bandwidth limit of the aggregated VPN connection could be the uplink bandwidth limit at VPN concentrator 101, the downlink bandwidth limit at VPN concentrator 101, uplink bandwidth limit at the network element, or downlink bandwidth limit at the network element.

In one variant, when the bandwidth limit is allocated among the VPN tunnels of an aggregated VPN connection dynamically, processing unit 502 determines which VPN tunnel has the highest traffic at a given time, and allocates the highest ratio of the bandwidth limit to a VPN tunnel having the highest traffic. The bandwidth limit al location may change frequently depending on the amount of traffic and/or the nature of traffic in each of the VPN tunnels of the aggregated VPN connection.

In another variant, the bandwidth limit is allocated among VPN tunnels of an aggregated VPN connection according to a policy. For illustration purpose, the policy is to allocate two-thirds of the bandwidth limit to a first VPN tunnel of the aggregated VPN connection during a first predefined time period, and one-thirds of the bandwidth limit to a second VPN tunnel of the aggregated VPN connection during the first predefined time period. The policy is also to allocate equal ratios of the bandwidth limit to the first VPN tunnel and the second VPN tunnel of the aggregated VPN connection during a second predefined time period. Therefore the policy is based on time. There are many reasons why such a policy may be desired. For example, the cost of using the first VPN tunnel is significantly lower than the cost of using the second VPN tunnel during the first predefined time period. During the second predefined time period, the cost of using the first VPN tunnel and the second VPN tunnel is almost the same. Therefore, higher bandwidth limit is allocated to the first VPN tunnel during the first predefined time period. It is common that usage price of connecting to networks provided by some carriers differs in peak and off-peak hours. The policy can also be based on service provider, usage, location, price, security, user identity, communication protocol, and/or communication technology.

In another variant, the bandwidth limit is allocated among VPN tunnels of an aggregated VPN connection according to a predefined configuration. For illustration purpose, VPN concentrator 101 is configured with a predefined configuration to allocate equal bandwidth limits to each VPN tunnel of an aggregated VPN connection. Therefore, if the bandwidth limit of an aggregated VPN connection is 30 Mbps, and the aggregated VPN connection comprises a first VPN tunnel and a second VPN tunnel, the bandwidth limit of the first VPN tunnel is 15 Mbps and the bandwidth limit of the second VPN tunnel is 15 Mbps. In another example, VPN concentrator 101 is configured with a predefined configuration increase the allocated bandwidth limit of the first VPN tunnel to 30 Mbps if the second VPN tunnel is disconnected.

In one variant the policy and/or the predefined configuration is sent to VPN concentrator 101 by an administrator manually, through a web interface, command line interface and/or application programming interface (API). The policy and/or the predefined configuration can then be stored remotely in a server or locally in secondary storage 505 or main memory 503.

Limiting Bandwidth According to Criteria

According to one of the embodiments of the present invention, VPN concentrator 101 limits VPN tunnel performance or aggregated VPN connection performance through VPN concentrator 101 and/or devices establishing VPN tunnels with VPN concentrator 101. The VPN tunnel performance restriction or aggregated VPN connection performance restriction is applied according to one or more criteria. Examples of criteria include port number, application, time, location, price, network bandwidth availability, and destination address. The criteria may be stored in a storage unit, such as secondary storage 505 or main memory 503. The bandwidth limit or consequence when the criterion/criteria is/are met is also stored in the storage unit.

Limiting Bandwidth According to Port Number

In one variant, bandwidth limitation is applied if data packets that are carried in a VPN tunnel using one of predefined Internet Protocol ports. For example, the predefined Internet Protocol port number is 20 for a file transfer and the bandwidth limit is 3 Mbps. Then the bandwidth that can be used for data packets with port number 20 is limited to 3 Mbps. The same applies to data packets that are carried in an aggregated VPN connection.

Limiting Bandwidth According to Application

In one variant, the bandwidth is limited according to application for which the VPN tunnel or aggregated VPN connection is being used. The application may be determined by deep packet inspection. In one embodiment, for illustration purpose, VPN concentrator 101 detects that a host or node, such as mobile phone 124 is using an aggregated VPN connection established between gateway 103 and VPN concentrator 101 for video conferencing. VPN concentrator 101 then limits the bandwidth of the aggregated VPN connection to 20 Mbps. In a preferred embodiment, the uplink bandwidth of the aggregated VPN connection at gateway 103 and at VPN concentrator 101 are limited by VPN concentrator 101. Alternatively, the downlink bandwidth of the aggregated VPN connection at gateway 103 and at VPN concentrator 101 can also be limited.

Limiting Bandwidth According to Time

In one variant, the bandwidth is limited according to the time. Mobile phone 125 establishes a VPN tunnel with VPN concentrator 101 using access connection 136a. For illustration purpose, VPN concentrator 101 limits the uplink bandwidth of access connection 136a, or the uplink bandwidth of the VPN tunnel at mobile phone 125, to 10 Mbps during office hours such as nine o'clock in the morning to five o'clock in the evening. From five o'clock in the evening to nine o'clock in the morning, VPN concentrator 101 does not limit the uplink bandwidth, or the uplink bandwidth limit is higher, such as 20 Mbps. This may help in preventing any one host or node such as mobile phone 125 to overuse bandwidth during office hours so that other hosts or nodes can also have considerable amount of bandwidth. In another embodiment, after a certain period of time has passed since establishing a VPN tunnel between mobile phone 125 and VPN concentrator 101, VPN concentrator 101 limits the uplink and/or downlink bandwidth of the access connection 136a to 10 Mbps. As some carriers may start charging higher usage price after a certain period of time, the bandwidth can be limited after the certain period of time in order to reduce the cost.

Limiting Bandwidth According to Location

In one variant, the bandwidth is limited according to location. Mobile phone 125 establishes an aggregated VPN connection with VPN concentrator 101. For illustration purpose, when mobile phone 125 is being used within a first location, the uplink bandwidth limit and the downlink bandwidth limit of the aggregated VPN connection is 10 Mbps. When mobile phone 125 is being used outside the first location, the uplink bandwidth limit and the downlink bandwidth limit of the aggregated VPN connection is 5 Mbps. There are many reasons why limiting bandwidth according to location may be desirable. For example, when a mobile phone is outside a specific country or region, the cost of connecting to a network may be higher than that when the mobile phone is inside the specific country or region. The signal quality may also deteriorate when the mobile phone is outside the specific country or region.

Limiting Bandwidth According to Price

In one variant, the bandwidth is limited according to price. Server 121 establishes an aggregated VPN connection with VPN concentrator 101. For illustration purposes, the uplink and downlink bandwidth limit at server 121 is 15 Mbps each when price for connecting to the VPN provided by the aggregated VPN connection is below a predefined threshold. The price for connecting to the VPN provided by the aggregated VPN connection includes the price corresponding to each VPN tunnel of the aggregated VPN connection. When the price becomes over the predefined threshold, the uplink and downlink bandwidth limit at server 121 is lowered to 5 Mbps each. This may be beneficial for minimizing the cost.

Limiting Bandwidth According to Network Bandwidth Availability

In one variant, the bandwidth is limited according to network bandwidth availability. When many devices are connecting to a same network, limited uplink and/or downlink bandwidth should be allotted to each device. Mobile phone 125 establishes a first VPN tunnel with VPN concentrator 101 using access connection 136a and server 121 establishes a second VPN tunnel with VPN concentrator 101 using access connection 133b. Both mobile phone 125 and server 121 connect to public/private interconnected networks 105 to establish the first and second VPN tunnels respectively. For illustration purpose only, when the total network bandwidth availability for hosts or nodes connecting to VPN concentrator 101 through access connections 131a, 131b, 131c and 131d is 20 Mbps, VPN concentrator 101 limits the uplink bandwidth for mobile phone 125 to 12 Mbps. Therefore, not all bandwidth of VPN concentrator 101 is consumed by mobile phone 125. In another variant, VPN concentrator 101 allots bandwidth to each VPN tunnel that it has established. For example, uplink bandwidth of 12 Mbps is allotted to the first VPN tunnel and uplink bandwidth of 8 Mbps is allotted to the second VPN tunnel by VPN concentrator 101, as the total network bandwidth available is 20 Mbps. In one variant, VPN concentrator 101 allots more bandwidth than it has in order to achieve higher bandwidth usage efficiency when all of the allotted bandwidth is not being used by the hosts or nodes. However, over-allotment may result in congestion and lower bandwidth usage efficiency.

Limiting Bandwidth According to Destination of Data Packets

In another example, the bandwidth is limited according to destination of data packets. This is useful in an office setting where employees are restricted to access certain websites. For example, node 120 provides a video hosting service and server 121 contains important official files. Laptop 127 is an office computer. For illustration purpose only, when laptop 127 establishes a VPN tunnel with VPN concentrator 101 for transmitting and/or receiving data packets to or from a website hosted at node 120, the bandwidth is limited to 5 Mbps. However, for other websites hosted at node 120, such bandwidth limit is not applied.

Limiting Bandwidth for Accessing Public Server

In one of the embodiments of the present invention, the criterion to limit bandwidth is whether the source or destination of data packets belongs to a public network. Therefore, bandwidth limitation only applies to hosts and/nodes that have not established a VPN tunnel with VPN concentrator 101. If a host or node has not established a VPN tunnel with VPN concentrator 101, it is likely that the host or node is an external host or node. An administrator of a private network may want to allot more bandwidth for data packets belonging to the private network than to external networks.

For illustration purpose only, server 121 is a server capable of forming VPN tunnels with VPN concentrator 101 and database server 122 is a public server accessible through the Internet. Mobile phone 125 has formed an aggregated VPN connection with VPN concentrator 101 through access connections 136a and 136b. The aggregated VPN connection between mobile phone 125 and VPN concentrator 101 comprises a plurality of VPN tunnels. All data packets from and to mobile phone 125 go through VPN concentrator 101 and the aggregated VPN connection. Server 121 and mobile phone 125 are in the same VPN. Therefore, when mobile phone 125 sends and receives data packets to and from server 121, the data packets are encapsulated. VPN concentrator 101 performs as a gateway for mobile phone 125 when communicating with database server 122. Also for illustration purpose only, the administrator tries to limit bandwidth available for accessing external server with 3 Mbps while not imposing any bandwidth limit for accessing internal server. As a result, VPN concentrator 101 is configured to allow mobile phone 125 to use less than 3 Mbps of bandwidth when communicating with hosts and/nodes not belonging to the VPN, such as database server 122. When mobile phone 125 sends and receives data packets to and from server 121, the data packets go through VPN concentrator 101. When mobile phone 125 transmits and receives data packets to and from database server 122, VPN concentrator 101 limits the uplink bandwidth and downlink bandwidth within 3 Mbps. On the other hand, when mobile phone 125 transmits and receives data packets to and from server 121, VPN concentrator 101 does not impose bandwidth limitation.

In one variant, VPN concentrator 101 also limits the bandwidth available for transmitting and receiving data packets to and from hosts or nodes belonging to the same VPN but the limit is higher than the bandwidth limited for sending and receiving data packets to and from hosts or nodes not belonging to the same VPN. This allows more bandwidth being allotted for communications within the same VPN.

In one variant, VPN concentrator 101 has lower quality of service target assigned for data packets being sent to or received from a host or a node that is not in a same VPN comparing to quality of service target assigned for data packets being sent to or received from a host or a node that is in a same VPN. This allows data packets belonging to the VPN to have higher quality of service. For illustration purpose only, laptop 123 and mobile phone 126 are in a first VPN that passes through VPN concentrator 101 while node 120 is a public node that does not belong to the first VPN. VPN concentrator 101 will give data packets being sent to and received from laptop 123 and mobile phone 126 higher priority or better quality of service than data packets being sent to and received from and node 120.

Limiting Number of Sessions

In one of the embodiments of the present invention, the number of sessions allowed simultaneously in a VPN tunnel or an aggregated VPN connection is limited. For example, the number of sessions allowed by VPN concentrator 101 in an aggregated VPN connection established with server 121 is limited to six sessions. Therefore, when there are more than six sessions in the aggregated VPN connection, such as three HTTP sessions with node 120, one Telnet session with laptop 123, and two FTP sessions with mobile phone 125, VPN concentrator 101 will not accept new sessions in the aggregated VPN connection. This can be beneficial as it can help controlling bandwidth used up by server 121 and reduce usage of computing and/or network resources of server 121. Those who are skilled in the arts would appreciate the consequences if too many sessions are allowed, such as memory bloat.

Limiting Network Performance

In one of the embodiments of the present invention, in addition to limiting bandwidth a VPN tunnel or aggregated VPN connection, network performance of the VPN tunnel or aggregated VPN connection is limited by VPN concentrator 101. Network performance that is limited may include packet drop rate, maximum transmission unit (MTU), and/or quality of service (QoS). For example, packet drop rate of an aggregated VPN connection or a VPN tunnel is increased by VPN concentrator 101 in order to limit uplink and/or downlink bandwidth of the aggregated VPN connection or the VPN tunnel. In another example, the MTU of IP data packets transmitted through a VPN tunnel or aggregated VPN connection is limited by VPN concentrator 101 in order to reduce delay and latency through the VPN tunnel or aggregated VPN connection. Lowering the MTU of IP data packets may especially be beneficial in reducing latency of VPN tunnels or aggregated VPN connections with low uplink and/or downlink bandwidth limit. In another example, VPN concentrator 101 configures QoS for each VPN tunnel or aggregated VPN connection established with VPN concentrator 101 so that resources are allocated to hosts or nodes according to criterion/criteria defined in VPN concentrator 101.

Determining Uplink or Downlink Bandwidth

FIG. 4 is a flow-chart illustrating a method for limiting bandwidth according to one of the embodiments of the present invention. FIG. 4 is viewed in conjunction with FIG. 1 for better understanding of the embodiments. In step 401, VPN concentrator 101 determines to limit bandwidth of a first VPN tunnel established between VPN concentrator 101 and server 121. Server 121 uses access connection 133*a* and VPN concentrator 101 uses access connection 131*a* for establishing the first VPN tunnel. VPN concentrator 101 may determine to limit the bandwidth of a VPN tunnel according to at least one of the following criteria: port number, application, time, price, network bandwidth availability, and destination address. In step 402, processing unit 502 of VPN concentrator 101 determines whether the uplink bandwidth of the first VPN tunnel at server 121 can be limited. If the uplink bandwidth of the first VPN tunnel at server 121 can be limited by VPN concentrator 101, then the uplink bandwidth of the first VPN tunnel is limited at server 121 in step 403. Alternatively, if VPN concentrator 101 cannot limit the uplink bandwidth of the first VPN tunnel at server 121, the downlink bandwidth of the first VPN tunnel at VPN concentrator 101 is limited in step 404. There could be various reasons why the uplink bandwidth of the first VPN tunnel at server 121 cannot be limited. For example, if the firmware of server 121 is not compatible with VPN concentrator 101, the VPN concentrator 101 may not be able to limit the uplink bandwidth of the first VPN tunnel at server 121. In this case, the bandwidth experienced by traffic passing from sever 121 to VPN concentrator 101 can be limited by limiting the downlink bandwidth of the first VPN tunnel at VPN concentrator 101 in step 404. In one variant, steps of FIG. 4 are carried out by another device running the management software module.

In one variant, an aggregated VPN connection is established between server 121 and VPN concentrator 101. The aggregated VPN connection comprises a first VPN tunnel using access connections 133*a* and 131*a*, and a second VPN tunnel using access connections 133*b* and 131 *b*. For illustration purpose only, in step 401, VPN concentrator 101 determines to limit bandwidth of traffic from server 121 to VPN concentrator 101 to 20 Mbps and determines to limit bandwidth of traffic from VPN concentrator 101 to server 121 to 15 Mbps. Processing unit 502 of VPN concentrator 101 determines whether the uplink bandwidth of the aggregated VPN connection at server 121 can be limited in step 402. If uplink bandwidth of the aggregated VPN connection at server 121 can be limited, VPN concentrator 101 limits the total uplink bandwidth of the aggregated VPN connection at server 121 to 20 Mbps in step 403. The 20 Mbps uplink bandwidth may be shared between the first VPN tunnel and the second VPN tunnel according to policies set by a VPN service provider. If uplink bandwidth of the aggregated VPN connection at server 121 cannot be limited, downlink bandwidth of the aggregated VPN connection at VPN concentrator 101 is limited to 20 Mbps. For traffic from VPN concentrator 101 to server 121, total uplink bandwidth of the aggregated VPN connection at VPN concentrator 101 is limited to 15 Mbps. The 15 Mbps bandwidth may be shared between the first VPN tunnel and the second VPN tunnel equally or unequally.

The program instructions for limiting bandwidth of VPN tunnels and/or aggregated VPN connections established between hosts or nodes connected to network 205 may be stored in secondary storage 505 or main memory 503 and executed by processing unit 502. The program instructions for limiting bandwidth may also be stored in storage units of the hosts or nodes and executed in the processing unit(s) of the hosts or nodes. In one variant, when the management software module is not running at VPN concentrator 101, the program instructions may also be retrieved by VPN concentrator 101 remotely from a device running the management software module. The program instructions may be stored in secondary storage 505 or main memory 503 after being retrieved remotely. The program instructions are then executed by processing unit 502.

The invention claimed is:

1. A method carried out at a system, wherein the system is implemented using Virtual Private Network (VPN) techniques, comprising:
(a) establishing, by way of a VPN concentrator, a first aggregated VPN connection and a second aggregated VPN connection with a first host and a second host, respectively;
(b) when the first aggregated VPN connection comprises a first plurality of VPN tunnels, the VPN concentrator applying uplink and downlink bandwidth limits to each of the first plurality of VPN tunnels;
(c) when the second aggregated VPN connection comprises a second plurality of VPN tunnels, the VPN concentrator applying uplink and downlink bandwidth limits to each of the second plurality of VPN tunnels;
(d) the first host encapsulating a first data packet in a first encapsulating packet;
(e) the first host transmitting the first encapsulating packet to the VPN concentrator using the first aggregated VPN connection;
(f) the VPN concentrator receiving the first encapsulating packet;
(g) the VPN concentrator decapsulating the first data packet from the first encapsulating packet;
(h) the VPN concentrator encapsulating the first data packet in a second encapsulating packet;
(i) the VPN concentrator transmitting the second encapsulating packet to the second host using the second aggregated VPN connection; and
(j) the second host decapsulating the first data packet from the second encapsulating packet;
(k) the VPN concentrator setting a first ratio of bandwidth limit among VPN tunnels of the first plurality of VPN tunnels and setting a second ratio of bandwidth limit among VPN tunnels of the second plurality of VPN tunnels; wherein the first ratio and the second ratio are set dynamically, according to a policy, or according to a predefined configuration.

2. The method of claim 1, further comprising: allocating a highest ratio of bandwidth limit to a VPN tunnel having highest traffic when at least one of, the first ratio and second ratio are set dynamically.

3. The method of claim 1, further comprising applying different uplink and downlink bandwidth limits during different predefined time periods when at least one of, the first ratio and second ratio are set according to a policy.

4. The method of claim 1, further comprising determining the predefined configuration based on at least one criterion when at least one of, the first ratio and second ratio are set according to a predefined configuration; wherein the at least one criterion is selected from a group consisting of port number, application, time, location, price, network bandwidth availability, and destination address.

5. The method of claim 1, further comprising the VPN concentrator limiting the number of sessions allowed simultaneously in at least one of, the first plurality of VPN tunnels, and the second plurality of VPN tunnels.

6. The method of claim 1, further comprising: the VPN concentrator limiting network performance of the first plurality of VPN tunnels and the second plurality of VPN tunnels, wherein the network performance to be limited is selected from a group consisting of: packet drop rate, maximum transmission unit (MTU), and quality of service (QoS).

7. The method of claim 1, further comprising:
applying the downlink bandwidth limits in steps (b) and (c) when the VPN concentrator is unable to apply uplink bandwidth limits; and
applying the uplink bandwidth limits in steps (b) and (c) when the VPN concentrator is unable to apply downlink bandwidth limits.

8. The method of claim 1, further comprising, after step (f), the VPN concentrator examining address information of the first data packet and creating the second encapsulating packet by updating destination address of a header of the first encapsulating packet.

9. The method of claim 1, further comprising, after step (g), the VPN concentrator performing network address translation on the first data packet.

10. The method of claim 1, wherein the VPN concentrator sends a tunnel management message to the first host and the second host for applying uplink and downlink bandwidth limits.

11. A system implemented using Virtual Private Network (VPN) techniques, comprising:
a VPN concentrator comprising a first plurality of network interfaces, a first at least one processing unit, a first at least one non-transitory computer readable storage medium storing program instructions executable by the first at least one processing unit:
(a) establishing by way of a VPN concentrator, a first aggregated VPN connection and a second aggregated VPN connection with a first host and a second host, respectively;
(b) when the first aggregated VPN connection comprises a first plurality of VPN tunnels, the VPN concentrator applying uplink and downlink bandwidth limits to each of the first plurality of VPN tunnels;
(c) when the second aggregated VPN connection comprises a second plurality of VPN tunnels, the VPN concentrator applying uplink and downlink bandwidth limits to each of the second plurality of VPN tunnels;
(d) the VPN concentrator receiving the first encapsulating packet;
(e) the VPN concentrator decapsulating the first data packet from the first encapsulating packet;
(f) the VPN concentrator encapsulating the first data packet in a second encapsulating packet;
(g) the VPN concentrator transmitting the second encapsulating packet to the second host using the second aggregated VPN connection;
(h) the VPN concentrator setting a first ratio of bandwidth limit among VPN tunnels of the first plurality of VPN tunnels and setting a second ratio of bandwidth limit among VPN tunnels of the second plurality of VPN tunnels; wherein the first ratio and the second ratio are set dynamically, according to a policy, or according to a predefined configuration;
(i) wherein the first host comprises a second at least one network interface, a second at least one processing unit, a second at least one non-transitory computer readable storage medium storing program instructions executable by the second at least one processing unit for:
(1) the first host encapsulating a first data packet in a first encapsulating packet; and
(2) the first host transmitting the first encapsulating packet to the VPN concentrator using the first aggregated VPN connection; and
(j) wherein the second host comprises a third at least one network interface, a third at least one processing unit, a third at least one non-transitory computer readable storage medium storing program instructions executable by the third at least one processing unit for:
the second host decapsulating the first data packet from the second encapsulating packet.

12. The system of claim 11, wherein the first at least one non-transitory computer readable storage medium further stores program instructions executable by the first at least one processing unit for: allocating a highest ratio of bandwidth limit to a VPN tunnel having highest traffic when the first ratio and/or second ratio are/is set dynamically.

13. The system of claim 11, wherein the first at least one non-transitory computer readable storage medium further stores program instructions executable by the first at least one processing unit for: applying different uplink and downlink bandwidth limits during different predefined time periods when the first ratio and/or second ratio are/is set according to a policy.

14. The system of claim 11, wherein the first at least one non-transitory computer readable storage medium further stores program instructions executable by the first at least one processing unit for: determining the predefined configuration based on at least one criterion when the first ratio and/or second ratio are/is set according to a predefined configuration; wherein the at least one criterion is selected from a group consisting of port number, application, time, location, price, network bandwidth availability, and destination address.

15. The system of claim 11, wherein the first at least one non-transitory computer readable storage medium further stores program instructions executable by the first at least one processing unit for: the VPN concentrator limiting number of sessions allowed simultaneously in the first plurality of VPN tunnels, and/or the second plurality of VPN tunnels.

16. The system of claim 11, wherein the first at least one non-transitory computer readable storage medium further stores program instructions executable by the first at least one processing unit for: the VPN concentrator limiting network performance of the first plurality of the VPN tunnels and the second plurality of VPN tunnels, wherein the network performance to be limited is selected from a group consisting of: packet drop rate, maximum transmission unit (MTU), and quality of service (QoS).

17. The system of claim 11, wherein when the VPN concentrator is unable to apply uplink bandwidth limits, applying the downlink bandwidth limits in steps (b) and (c);

and wherein when the VPN concentrator is unable to apply downlink bandwidth limits, applying the uplink bandwidth limits in steps (b) and (c).

18. The system of claim 11, wherein the first at least one non-transitory computer readable storage medium further stores program instructions executable by the first at least one processing units for: after step (d), the VPN concentrator examining address information of the first data packet and creating the second encapsulating packet by updating destination address of a header of the first encapsulating packet.

19. The system of claim 11, wherein the first at least one non-transitory computer readable storage medium further stores program instructions executable by the first at least one processing units for: after step (e), the VPN concentrator performing network address translation on the first data packet.

20. The system of claim 11, wherein the first at least one non-transitory computer readable storage medium further stores program instructions executable by the first at least one processing units for: VPN concentrator sending a tunnel management message to the first host and the second host for applying uplink and downlink bandwidth limits.

* * * * *